June 24, 1930.  R. T. HOSKING  1,767,287
BOLT LOCK
Filed April 30, 1928
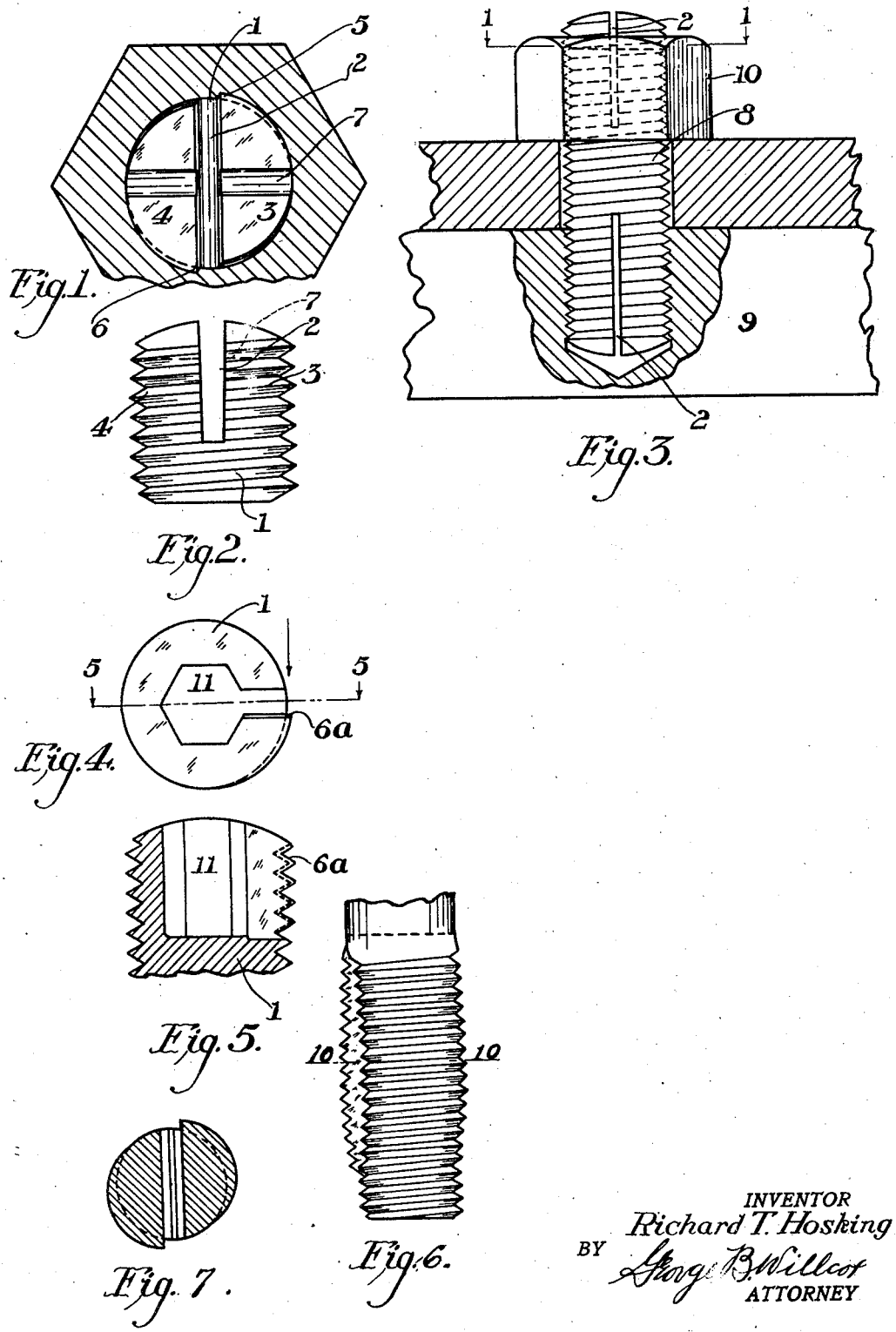
INVENTOR
Richard T. Hosking
BY
ATTORNEY Patented June 24, 1930

1,767,287

UNITED STATES PATENT OFFICE

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE

BOLT LOCK

Application filed April 30, 1928. Serial No. 273,805.

This invention is a self-locking screw or bolt. The object of the invention is to provide a screw or bolt that can be screwed into the threaded opening in a nut or in a piece of work and will automatically engage the complementary threads in such manner that it will resist all ordinary forces tending to unscrew it. The ultimate amount of such resistance to unscrewing afforded by the locking device may be such that a screw can be removed without material damage either to itself or to the work, or if desired the ultimate resistance to unscrewing may be so great that a screw can not be taken out without spoiling it or spoiling the thread in the work.

The invention, therefore, is capable of various modifications both as regards the ultimate effectiveness of locking and as regards some of its structural detail.

More specifically, the locking element is a spring tongue constituting an integral part of the screw or bolt. The tongue clutches, binds or bites the thread of the nut or of the work into which the bolt has been screwed. The locking action of the spring tongue, as above stated, may vary somewhat in detail according to the form of the tongue, but is primarily characterized by possessing a normal tendency to spring and thereby project an edge of its threaded surface outward or away from the axial line of the screw, that is to say, outward beyond the wall of the imaginary cylinder that defines the periphery of the screw.

One kind of locking action of the spring tongue resembles that of a pawl and ratchet, except that the part engaged by the locking element or spring tongue has no co-operating notches. When this kind of locking action is employed the bolt may be removed by unscrewing without distorting either the spring tongue or the work. In this case the tongue provides resistance against unscrewing, but not necessarily a positive lock.

The difference between the two kinds of locking action above mentioned is principally due to a modification of the shape and width of the tongue, although the basic and characteristic feature of its spring-like projecting portion is the same in both cases. Both kinds of locking action are, therefore, included in the scope of the invention as claimed herein.

The spring tongue is preferably made by forming a slit or slot that extends from an end of the bolt lengthwise for a suitable distance. The slit divides the bolt for a part of its length into two externally threaded members, both of which are of segment-shaped cross section, or substantially so. Both of these members can be used as spring tongues for the purpose of this invention, or only one may be used, as circumstances warrant. Either of them may have its side edges cut away and thus be reduced in width without departing from the invention as claimed.

With the foregoing and certain other objects in view, which will appear later in the specification, my invention comprises the devices described and claimed and the equivalents thereof.

In the drawings Fig. 1 is a top plan view of a screw embodying my improvement and is shown as applied to a nut, the latter being illustrated in cross section on the line 1—1 of Fig. 3 and partly broken away.

Fig. 2 is a side view of the slotted screw shown in Fig. 1.

Fig. 3 is a detail view of a threaded stud embodying my improvement, one end of the stud received in the threaded hole of a piece of work, the other end received in a nut, the work being shown partly in section.

Fig. 4 is a top plan view of a screw embodying the invention in modified form.

Fig. 5 is a part longitudinal section on the line 5—5 of Fig. 4.

Fig. 6 is a side view of a screw embodying another modified form of the invention.

Fig. 7 is a cross section on line 10—10 of Fig. 6.

A simple headless set screw incorporating the new structure and mode of operation is shown at 1 in Figs. 1 and 2. The set screw is provided with a slot 2 to receive a screw driver, but this slot is cut very much deeper than the slot for an ordinary straight-edge screw driver. The resulting two segment-shaped members 3, 4 are spread apart at their free ends. These free ends are offset in a direction parallel to the slot 2, so that the extremities of the two members become eccentric in relation to each other. Two of the resulting corners 5, 6 are thus projected outside of the theoretical cylindrical body of the bolt.

A screw made in accordance with Figs 1 and 2 as above described may be inserted in the threaded hole of a piece of work or into a nut as shown in Fig. 1 and thereby the outwardly projected portions 5, 6 will be sprung back into their normal position, but their inherent spring tension will give a persisting tendency to project their sharp edges outward and thereby bind or bite into the threaded wall of the work or nut. Such biting action produces a locking effect which is adequate for some uses, although as above mentioned, the screw can be removed by means of an ordinary screw driver if sufficient force is exerted.

A more permanent and positive locking effect is attained in the following manner:

A second screw driver slot 7 of ordinary depth is formed in the end of the screw at right angles to the deep slot 2. The screw may now be set in place by applying the screw driver to either of the slots 2 or 7. It is found in practice that the screw can be drawn tighter by the use of the shallower slot than by using the deeper one. Moreover, the shallower slot 7 has a further function which will now be explained. If the screw driver is inserted in the slot 7 of a previously tightened screw and is turned backwardly it has the immediate effect of increasing the outward pressure of the offset projecting corners 5, 6 of the screw thread and forces them to bite deeper into the threaded walls of the work or nut. A greatly augmented initial locking is thereby attained. Obviously, the slot 7 or its equivalent is in that respect the mechanical feature that enables this further new locking result to be effected.

In Fig. 3 is shown a threaded stud 8 which is provided with the locking device. In this example the stud is formed at both ends with deep slots 2 and the offset segment-shaped spring tongues above described, and is, therefore, adapted to lock the stud to the work 9, as well as to the nut 10.

In Figs 4 and 5 is shown a modification of the biting or spring tongue idea, wherein the end of the screw 1 is recessed at 11, so that a hexagon pointed screw driver may be used instead of an ordinary straight-edge screw driver, and here one side only of the screw is shown slitted and only one of the resulting corners 6ª is projected outwardly to form a biting edge. The outwardly projecting edge is shown in Fig. 5 by full lines and the normal position of the edge before projecting is shown by dotted lines.

Although I have for purposes of description illustrated and defined the invention as it appears when embodied in a threaded screw or bolt, it will be understood that it is also applicable to a bolt or cylindrical bar which has no threads. Such a cylindrical bar formed with the offset spring tongue herein described can be inserted in a cylindrical hole in a piece of work and can be freely rotated in one direction, but is retarded or locked with respect to rotation in the reverse direction. In other words, the absence of bolt threads does not deprive the invention of its utility as a locking device to prevent rotation of the bolt in the backward direction. Consequently certain of the claims set forth the invention in this broader aspect.

In the form shown in Figs. 6 and 7 the slit passes through the body of the screw, but does not extend to either end of it.

Having thus described my invention, what I claim and desire to secure by Letters Patent is:

1. A cylindrical member adapted to be received in a complemental hole in a piece of work and formed with a slit extending lengthwise from an end thereof and defining a spring tongue, the free end of the tongue displaced sidewise in a direction parallel to the plane of the slit to provide an offset portion which presents to the work a biting edge that normally projects beyond the cylindrical periphery of the screw and engages the work in locking relation, for the purposes set forth.

2. A threaded screw formed with a longitudinally extending slit that divides a portion of the length of the screw body into two complemental resilient locking members, said members disposed in sidewise offset relation to each other in a direction parallel with the plane of the slit.

3. A threaded screw adapted to be received in a complemental threaded hole in a piece of work, its entering end solid and its other end formed with a slit extending lengthwise the screw, and defining a spring tongue, the free end of which is displaced in a direction parallel to the plane of the slot to provide a biting edge remote from the entering end of the screw that normally projects beyond the cylindrical periphery of the solid end of the screw and engages the work in locking relation.

4. A threaded set screw having its advancing end solid, its other end bifurcated, the members of the bifurcated end offset with relation to each other in the plane of bifurcation.

In testimony whereof, I affix my signature.

RICHARD T. HOSKING.